(12) United States Patent
Schröder

(10) Patent No.: US 7,510,389 B2
(45) Date of Patent: Mar. 31, 2009

(54) THERMOSHAPING MACHINE

(75) Inventor: Jens Schröder, Stockelsdorf (DE)

(73) Assignee: Gabler Thermoform GmbH & Co. KG, Lubeck (DE)

( * ) Notice: Subject to any disclaimer, the term of this patent is extended or adjusted under 35 U.S.C. 154(b) by 0 days.

(21) Appl. No.: 11/715,701

(22) Filed: Mar. 8, 2007

(65) Prior Publication Data
US 2007/0210487 A1 Sep. 13, 2007

(30) Foreign Application Priority Data

Mar. 8, 2006 (DE) .................... 10 2006 011 039.0
Apr. 27, 2006 (DE) .................... 10 2006 019 532.9

(51) Int. Cl.
*B29C 51/38* (2006.01)

(52) U.S. Cl. .................. 425/451.4; 425/451.6; 100/286

(58) Field of Classification Search ............. 425/451.4, 425/451.6, 593; 100/282, 286
See application file for complete search history.

(56) References Cited

U.S. PATENT DOCUMENTS

| | | | |
|---|---|---|---|
| 2,269,758 A * | 1/1942 | De Noronha | ................. 425/167 |
| 2,864,305 A * | 12/1958 | Golding | ....................... 100/286 |
| 4,158,539 A * | 6/1979 | Arends et al. | ............. 425/451.4 |
| 4,588,364 A * | 5/1986 | Schad | ....................... 425/451.6 |
| 4,608,009 A * | 8/1986 | Whiteside et al. | ......... 425/451.6 |
| 5,176,923 A * | 1/1993 | Ito | ........................... 425/451.6 |
| 6,200,122 B1 * | 3/2001 | Chun et al. | .............. 425/451.6 |
| 6,477,945 B1 * | 11/2002 | Imanishi et al. | .......... 425/451.6 |

FOREIGN PATENT DOCUMENTS

| | | |
|---|---|---|
| CH | 399 724 | 9/1965 |
| DE | 36 04 255 | 8/1987 |
| DE | 198 48 628 | 4/2000 |

* cited by examiner

*Primary Examiner*—James Mackey
(74) *Attorney, Agent, or Firm*—Andrew Wilford

(57) ABSTRACT

A press has a frame including guides extending in a predetermined direction and a pair of tool-halves mounted on the frame and are movable on the guides in the direction toward and away from each other. Two knee-lever linkages symmetrically spacedly flanking each tool half with respect to a center plane substantially parallel to the direction, each coupled to the respective tool half and to the frame, and operable to shift the tool halves in the direction. Respective reversible, rotary drives each carry an eccentric output connected to respective drive links extending to the linkages. A controller connected to the drives rotates the eccentrics oppositely in respective first senses to press the one half in the direction against the other half and thereafter to pull the one half in the direction away from the other half with the two linkages never extending into a central region of the machine.

8 Claims, 5 Drawing Sheets

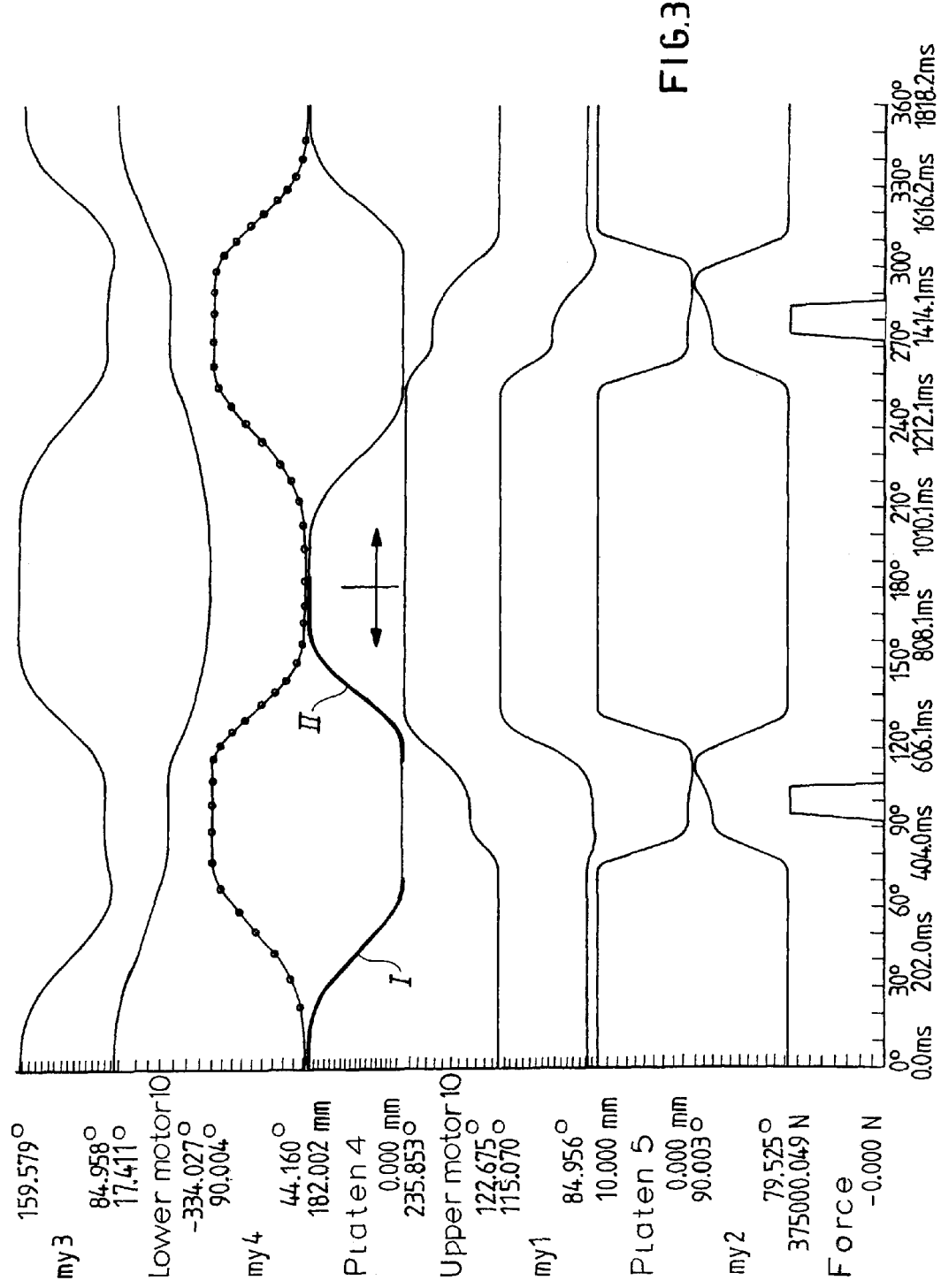

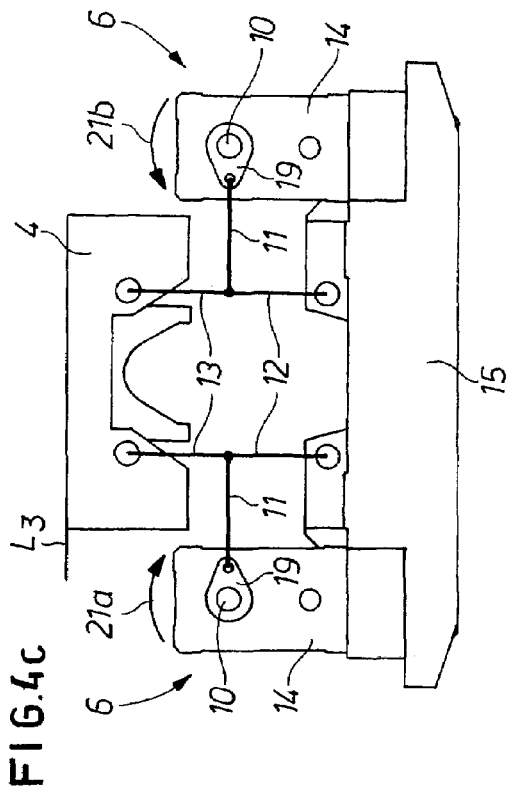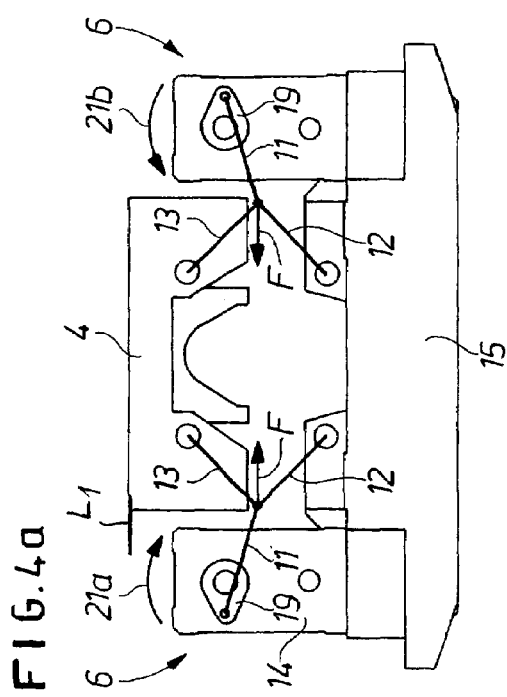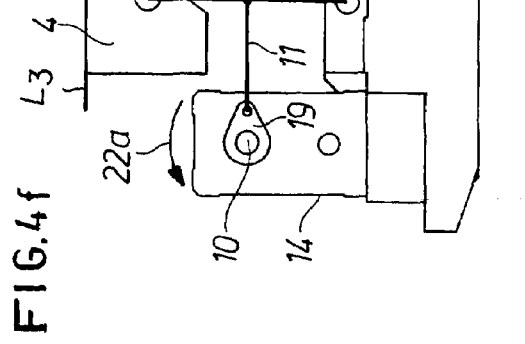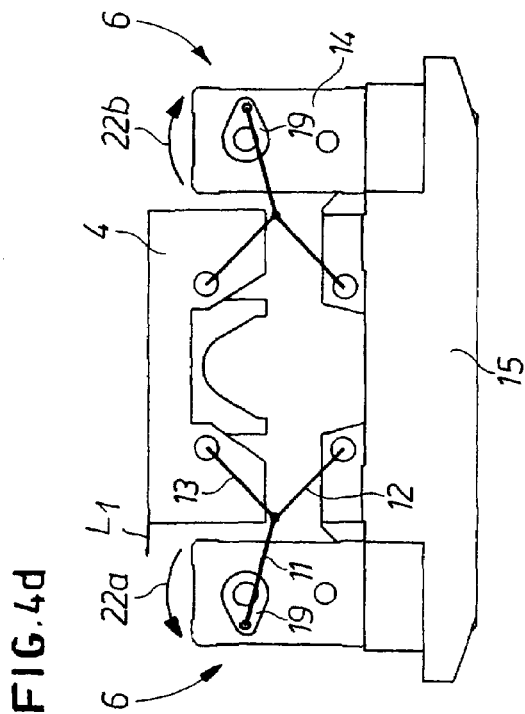

THERMOSHAPING MACHINE

FIELD OF THE INVENTION

The present invention relates to a press machine. More particularly this invention concerns a machine for thermoshaping or punching a sheet workpiece and a method of operating such a machine.

BACKGROUND OF THE INVENTION

A typical thermoshaping press has upper and lower platens carrying respective tool or die halves. One of the die halves can be moved toward the other or both of them can be moved together to grip, heat, and deform a sheet workpiece, typically a thermoplastic synthetic-resin foil. In a standard system the sheet is formed with an array of upwardly open cups or pockets that are subsequently filled with a product, e.g. pills or yoghurt, and then a cover sheet, which can be plastic or a metal foil, is laminated over the upwardly open pockets or cups, and finally the laminate is cut into individual packages.

The press can serve to form the pockets, and can also be used to either actually punch out the pockets and a flange from the workpiece, or to score the workpiece so deeply between the pockets as to allow them to be readily separated from one another. Such a system is invariably part of a production line where cycling speed is very critical.

Swiss patent 399,724 describes such a system where the die halves, which can be used for deforming or punching, are shifted by respective pneumatic cylinders. To this end each platen is slidable along several guide rods. A knee linkage comprised of two: rigid links serves to vertically reciprocate the platen. Each link has an outer end pivoted either on the platen or on the machine frame and an inner end pivoted on the inner end of the other link. The piston rod of the pneumatic actuator is pivoted on the inner ends of the links so that it can flex the linkage and in effect push the outer ends apart or pull then together to shift the platen. Such a system is fairly slow.

It is known from DE 36 04 255 A1 to use a spindle system to implement the drive mechanism for opening and closing the tool, at least one ball screw being used. The spindle is driven by a drive motor. One end of the spindle is threaded into a big nut pivoted on the inner ends of the links, thereby permitting operation of the toggle link mechanism, and thus opening and closing of the tool, by axial displacement of the spindle. The tool part, which is linked to the toggle link mechanism, may thus be moved into its required positions. The spindles are usually designed as ball screws or planetary roller screws, which has the disadvantage that the maximum rotational speed of the spindle during operation is limited. The tool can be opened and closed only with a certain maximum threshold speed, which in turn limits the cycle time of the thermoshaping machine and thus the output of finished articles.

Another disadvantage is that the roller screw drives must be located in the middle of the tool or tool platform on account of the necessary central introduction of force. However, for some models of thermoshaping machines the prestretcher, which performs a mechanical preshaping of the heated plastic foil, for example by means of an air blast pushing the softened foil into die cavities, must be situated at this location. The prestretcher is required in particular for tall articles, and to reduce the complexity the prestretcher is not integrated into the tool, but instead must be positioned in the middle, i.e. centrally, in the thermoshaping machine, resulting in the need for appropriate space at this location. As a rule, the prestretcher must be able to perform a motion that is independent of the motion of the tool platform.

Another design of the drive mechanism for a tool part provides that, by means of a gear unit having a downstream crank mechanism, a servomotor actuates a knee-lever linkage which likewise moves the tool platforms into the required position. Both of the identically directed knee-lever linkages are simultaneously moved in the same direction by means of a connecting rod.

This knee-lever linkage has the disadvantage that the two identically directed toggle link pairs must move perpendicular to the opening and closing motion of the tool part by means of a single drive. This produces inertial forces which act perpendicular to the opening and closing motion of the machine, resulting in tilting of the entire molding or stamping station. The guide columns for the tool parts are not able to acceptably absorb these forces and deformations. The adverse effects are not only greater wear on the guide columns and bushings, but also significantly reduced service life of the steel strips used for cutting out the articles. Maintaining the two tool halves in a parallel configuration, which is extremely important when working with steel strips, is impaired by the high lateral inertial forces. Thermoforming machines of this type can therefore be operated only with a limited cycle frequency. A further disadvantage of this design is that the machine must be modified for different opening and closing strokes.

OBJECTS OF THE INVENTION

It is therefore an object of the present invention to provide an improved thermoshaping press.

A further object is to provide an improved method of operating such a press.

Another object is the provision of such an improved thermoshaping press that overcomes the above-given disadvantages, in particular that allows a high cycle frequency, operates without interfering lateral forces as a result of the toggle link inertial forces, and, lastly, permits sufficient space for providing a prestretcher.

SUMMARY OF THE INVENTION

A press has according to the invention a frame including guides extending in a predetermined direction, a pair of tool halves mounted on the frame, one of the halves are movable on the guides in the direction toward and away from the other of the halves, two knee-lever linkages symmetrically spacedly flanking the one tool half with respect to a center plane substantially parallel to the direction, coupled to the one half and to the frame, and operable to shift the one tool half in the direction, respective reversible rotary drives each carrying an eccentric output, respective drive links extending between the eccentric outputs and the linkages, control means connected to the drives for rotating the eccentrics oppositely in respective first senses to press the one half in the direction against the other half and thereafter to pull the one half in the direction away from the other half with the two linkages never extending into a central region of the machine at the plane.

The method according to the invention includes the steps of rotating the eccentrics oppositely through a predetermined first angle in respective first senses to press the one half in the direction against the other half and thereafter through predetermined second angles different from the first angles to pull the one half in the direction away from the other half with the two linkages never extending into a central region of the machine at the plane. The eccentrics are rotated at such speeds that, despite the different angular travels between the open and closed positions. The travel time is the same for the opening and closing movements.

As a result of the symmetrical, i.e. mirror-image, configuration of: two knee-lever linkages, the inertial forces that act transverse to the opening and closing motion of the tool in the movement of the systems are mutually eliminated, thereby allowing the machine to run very smoothly.

The drive motor together with the crank is preferably provided on the side of the knee-lever linkage facing away from the center plane, resulting in a region in the vicinity of the center plane which is free of drive mechanisms. As a result of this design, the drive motors, optionally together with the associated gear unit, are laterally mounted on the thermoshaping machine, and the middle region of the machine can be kept completely free of drive means for moving the tools. It is thus possible to provide mechanical prestretchers in the middle region where they are required, and sufficient space is available for them.

Since it is common to provide a pair of tool parts that are synchronously but oppositely reciprocated toward and away from each other, so that there is ample clearance to advance the workpiece between successive shaping/punching operations, both the lower tool part as well as the upper tool part may each be provided with crank drive according to the invention.

Each knee-lever linkage may be composed of two spaced-apart pairs of toggle links each driven by a respective crank. This ensures the parallel guiding of the tool part in two mutually perpendicular directions transverse to the opening and closing direction of the tool. Thus, a total of four toggle link pairs are used which ensure optimum guiding of the tool part.

The drive motor, together with a gear unit and the bearing for the at least one crank, is preferably mounted in or on a housing.

The thermoshaping machine according to the invention may also be only a part of a number of stations used for producing thermoshaped articles. Therefore, according to one embodiment the drive mechanism is designed for combined molding of articles made of thermoplastic foil and punching out the articles from the thermoplastic plastic foil. Alternatively, however, the drive mechanism may be designed solely for punching out the article molded from thermoplastic plastic foil. In addition, the formation of holes in the articles is implemented by an additional hole-punching station of this type.

To ensure synchronous motion of the mirror-image knee-lever linkages, one refinement provides that the motion, in particular the rotational angle, of the two mirror-symmetrical drive motors is coupled. The motion-dependent coupling is preferably achieved by electronic means. Servomotors or three-phase motors are primarily used as drive motors, but torque motors in particular, which act directly the eccentric without a transmission, may also be used.

The invention enables a high cycle time for the thermoshaping machine. Cycle times up to 85 cycles per minute and greater may be achieved.

Furthermore, the drive system is completely free of transverse forces, i.e. inertial forces, located transverse to the opening and closing motion of the tool. Laterally directed inertial forces are eliminated in the entire system, so that the machine maintains a stationary position.

Last, the middle region of the thermoshaping machine remains free, so that a prestretcher may be easily accommodated at this location without colliding with the drive mechanism. The required space in the upper tool, i.e., where the prestretchers are situated, remains free.

By use of two separate drives or drive motors, for opposite rotational directions it is possible to move both sides of the tool part in parallel at the same height.

BRIEF DESCRIPTION OF THE DRAWING

The above and other objects, features, and advantages will become more readily apparent from the following description, reference being made to the accompanying drawing in which:

FIG. 3 is a graph illustrating operation of the machine according to the invention; and FIGS. 4a-4c, and 4d-4f are side views illustrating the machine according to the invention in succeeding cycles.

SPECIFIC DESCRIPTION

Figure 1:
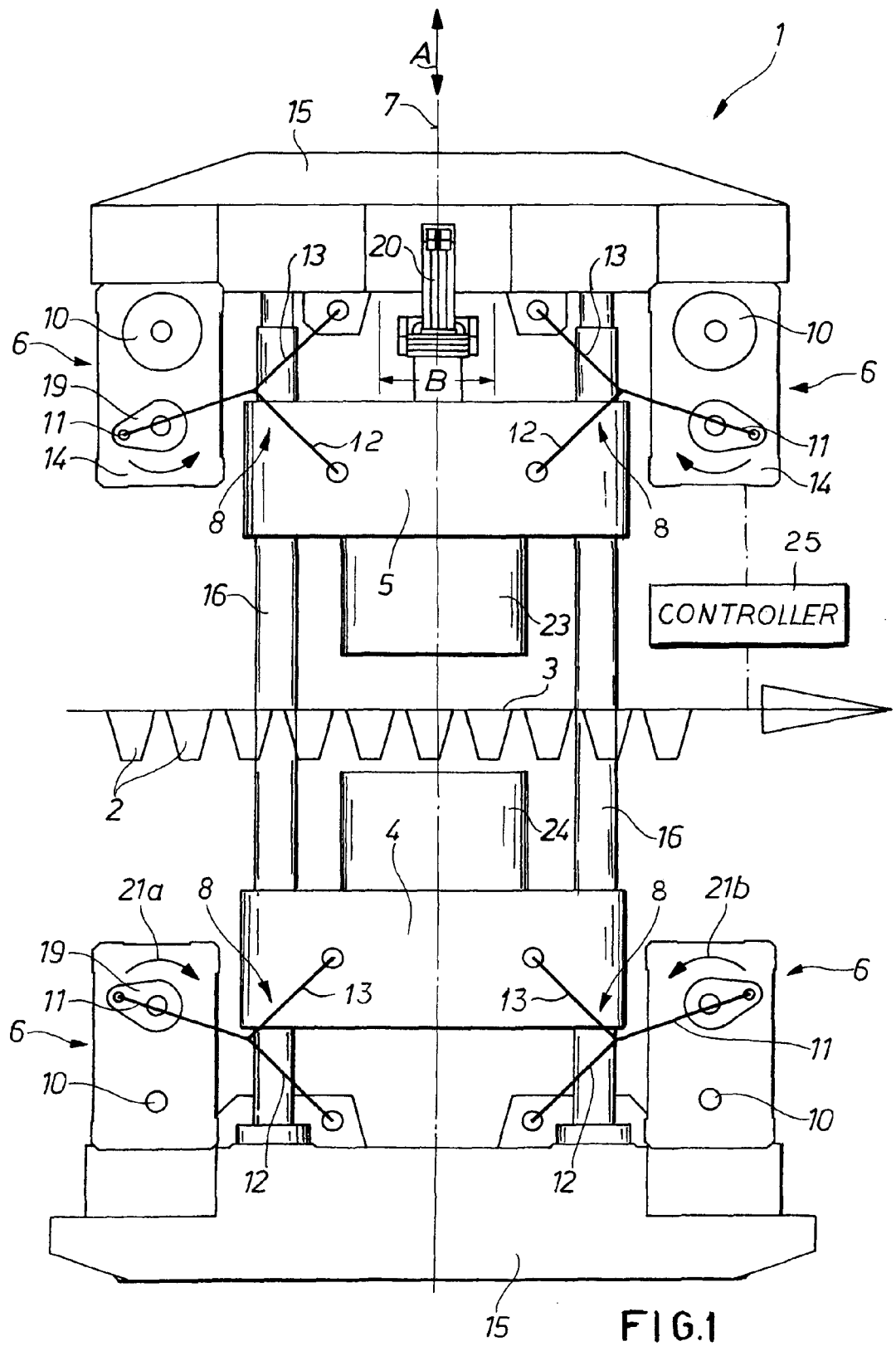
FIG. 1 is a partly diagrammatic side view of a thermoshaping machine according to the invention.
Figure 2:
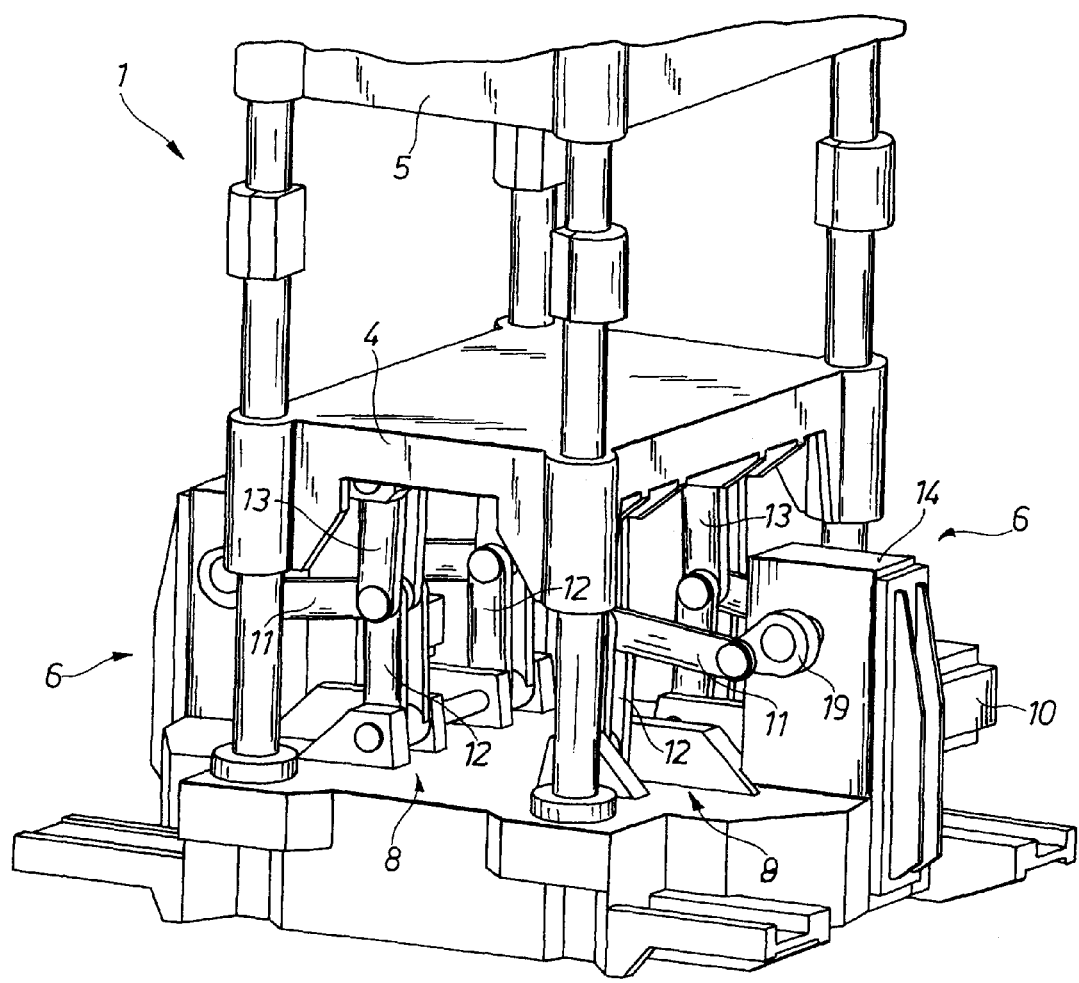
FIG. 2 is a perspective view of the lower part of the emachine.

As seen in FIGS. 1 and 2 a thermoshaping machine 1 forms pockets 2 in a basically planar thermoplastic plastic sheet or foil 3. For this purpose the foil 3 is heated and is fed horizontally between lower and upper platens 4 and 5 respectively carrying upper and lower tool or die halves 24 and 23. In the illustrated embodiment, both tool halves 23 and 24 can move vertically along guide columns or tie rods 16 in a vertical opening and closing direction A.

The tool halves 23 and 24 are each shifted by two respective actuators 6 each having two knee-lever linkages 8 provided in a mirror-image configuration with respect to a vertical center plane 7 of the thermoshaping machine 1. As shown in FIG. 2, each of the two knee-lever linkages 8 of each actuator 6 in turn has lower and upper toggle links 12 and 13 and the linkages 8 are positioned symmetrically flanking the plane 7, so that each platen 4 and 6 is shifted by four systems 8 each having two toggle links 12 and 13 at their corners. The toggle links 12 and 13 have inner ends pivoted on one another and outer ends pivoted at the top and bottom to a machine frame 15 and to the platens 4 and 5. For actuation of the toggle links 12 and 13 each knee-lever linkage 8 has a respective link 11 which is pivoted at one end on an eccentric 19 rotatable about a horizontal axis and at an opposite end on the pivot between the inner ends of the two respective links 12 and 13.

The crank drives formed by the eccentrics 19 are always rotated in opposite directions as indicated by arrows 21a and 21b in FIG. 1. Each eccentric 19 is supported in a respective gear unit 14 of the respective actuator 6 and is driven by a drive motor 10, so that each motor 10 drives two eccentrics 19 each driving a respective linkage 8. The drive motor 10 is preferably a servomotor which is able to execute precise rotational movements and can be electrically, hydraulically, or even pneumatically powered. Since the drive motors 10 rotate the respective cranks 19 in the opposite directions, inertial forces in the knee-lever linkages 8 are canceled out in a direction transverse to the opening and closing direction A, thus preventing high stresses from being exerted on the guide columns 16. The system comprising the drive motor 10, the gear unit 14 between the drive motor 10 and the respective two eccentrics 19, and the cranks 11 forms a crank mechanism which actuates the toggle links 12 and 13.

The rotational motion, i.e. the torque, for the toggle links 12 and 13 may be generated either by means of two individual servomotors or three-phase motors with output-side gear units, or by only one gear unit having two outputs and a drive motor 10 centrally mounted on the gear unit. A torque motor may also be used, in which case the gear unit between the motor 10 and the eccentric 19 can be omitted.

As mentioned above, the drive shafts for the individual linkages 8 rotate in opposite directions. The rotation of the drive motors 10 on each side of the center plane 7 may be synchronized in a master-slave operation. Programmable machine control and incremental or absolute sensors provided on the drive motors 10 perform the required position compensation for each of the two motors 10, which is already known with reference to the provided electronic means (also known by the term "electronic shaft").

FIG. 3 shows the curves over the angle of rotation or time for several system parameters of the thermoshaping machine. The angular position of the eccentric 19 for the crank mechanism is plotted on the X-axis. In the present case, reference is made to the motion of the lower tool part 4 illustrated by the solid line, with thicker region I corresponding to raising of the tool part 4 at about 202 ms and thickened region II dropping of the part 4 at about 158° to open the press. The Y-axis shows in region from 0° to 180° the first work cycle and from 180° to 360° the second work cycle.

The crank mechanism is set up such that for each work cycle the same rotational direction is maintained. FIGS. 4a-4f shows how the knee linkages 12 and 13 of the systems 8. In these figures only the lower part of the press is shown, it being understood that the upper portion operates and moves synchronously and oppositely.

More particularly as shown in FIG. 4a the system starts with the platen 4 in its lowermost position, at level $L_1$. Here the two links 12 and 13 of both linkages 8 are roughly at 90° to each other, in the smallest angle they can form because the pivots of the eccentric cranks 19 are at their widest spread, with the left-hand one in the nine o'clock position and the right-hand one in the three o'clock position.

Figure 4E:
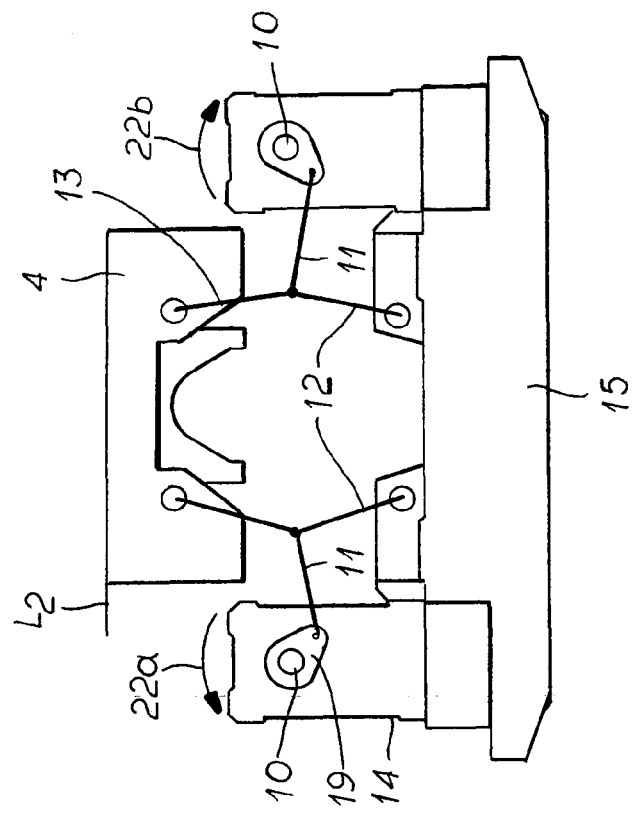
Figure 4B:
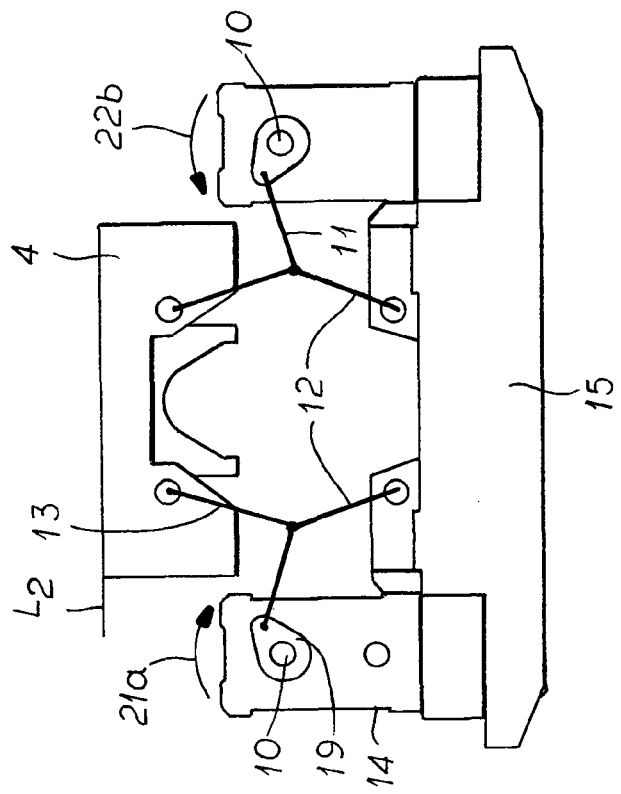

The two cranks 19 are then oppositely rotated through 158° in the directions of arrows 21a and 21b to the position of FIG. 4b where the platen 4 is raised to intermediate level $L_2$ and the links 12 and 13 form a very large obtuse angle to each other, but are not in line or parallel to each other. During such movement the workpiece 3 is deformed to have the cups 2. In this raised position the drives 10 stop so that the newly formed cups 2 can cool somewhat.

After an appropriate cooling time, the drives 10 continue to rotate the cranks 19 through 202° in the same directions 21a and 21b from the FIG. 4b position with the platen 4 at level $L_2$ to the FIG. 4c position in which the platen 4 is raised a small amount more to level $L_3$ and the two arms 12 and 13 are vertically aligned with each other and perfectly straight. The mechanical advantage for this movement through 22° of rotation of the cranks 19 is considerable, and serves to punch the cups 2 out of the workpiece 3 or so compress the workpiece 3 that the cups 2 can easily be separated from it. The system does not, however, stop in the position of FIG. 4c, but continues rotating in the same directions 21a and 21b to return to the FIG. 4a position, where it stops again so the workpiece 3 can be advanced, having completed 360° of rotation. Thus in this cycle the system only stops in the positions of FIGS. 4a and 4b, and moves without stopping through the FIG. 4c position.

In a succeeding cycle the action is similar, but rotation is in opposite direction 22a and 22b. Thus the cranks 19, counter-rotating in directions 22a and 22b move from the fully spread position of FIG. 4d at level $L_1$, then stops in the FIG. 4e position at $L_2$ while the workpiece cools, then moves in the same direction to pass through the FIG. 4f position at level $L_3$, then finally stops in the starting position at level $L_1$ of FIG. 4d.

Since the crank mechanisms for the continuously selectable strokes of the tool parts do not operate over a rotation of 360°, the two cycles resulting from one rotational direction have times of different lengths, provided that the rotational speeds are constant in the individual motion segments. This results in residence times of different lengths during heating of the foil, which in turn prevent consistent quality of the deep-drawn article. For this reason the rotational speed is adjusted by programmable instrumentation so that the two subsequent rotational regions take the same amount of time.

The described thermoshaping machine has at least one station and a maximum of three stations, each provided with two platens 5 and 4 that carry the respective tool halves 23 and 24. Depending on the direction of deformation of the article the tool halves must traverse the corresponding tool platform stroke in a continuous movement. The stroke of the tool parts may be continuously adjusted without performing modifications.

In the central region of the proposed thermoshaping machine a free region B (see FIG. 1) remains in which the mechanical prestretcher or prestretcher drive 20 may be easily provided in the upper tool 5.

Whereas for the previously known machines it is often possible to achieve a maximum cycle time of only 40 to 70 cycles per minute, by use of the proposed design cycle times of 85 cycles per minute and greater are easily achieved.

I claim:

1. A press comprising:
   a frame including guides extending in a predetermined direction;
   a pair of tool halves mounted on the frame, one of the halves being movable on the guides in the direction toward and away from the other of the halves;
   two knee-lever linkages symmetrically spacedly flanking the one tool half with respect to a center plane substantially parallel to the direction, coupled to the one half and to the frame, and operable to shift the one tool half in the direction, each linkage including two levers having inner ends pivoted together and outer ends, the outer end of one of the levers of each linkage being pivoted on the frame and the outer end of the other of the levers of each linkage being pivoted on the one tool half;
   respective reversible rotary first drives symmetrically flanking the plane and each including a respective servomotor carrying an eccentric output;
   respective drive links pivoted on the eccentric outputs and the inner ends of the levers of the linkages; and
   control means connected to the drives for rotating the eccentric outputs oppositely in respective first senses to press the one half in the direction against the other half and thereafter to pull the one half in the direction away from the other half with the two linkages never extending into a central region of the press at the plane.

2. The press defined in claim 1 wherein the linkages move between inner positions with the respective levers extending generally parallel to the plane and the one half pressed against the other half and outer positions with the respective levers extending at an angle of substantially less than 180° to each other.

3. The press defined in claim 1 wherein each servomotor includes a transmission.

4. The press defined in claim 1, further comprising
   means for stepping a sheet workpiece perpendicular to the direction between the tool halves.

5. The press defined in claim 1, further comprising
   two second knee-lever linkages symmetrically spacedly flanking the other tool half with respect to the center plane, coupled to the other half and to the frame, and operable to shift the other tool half in the direction;

respective second reversible rotary drives each carrying an eccentric output; and respective second drive links extending between the eccentric outputs and the second linkages, the control means being connected to the second drives to operate same synchronously with the first drives.

6. The press defined in claim 5 wherein the first and second drives are mechanically coupled to each other.

7. The press defined in claim 5 wherein the first and second drives are electronically coupled to each other.

8. The press defined in claim 5 wherein each of the drives is provided with a respective housing mounted on the frame.

\* \* \* \* \*